(12) United States Patent  (10) Patent No.: US 8,819,458 B2
Morita  (45) Date of Patent: Aug. 26, 2014

(54) INFORMATION PROCESSING APPARATUS, PROGRAM EXECUTION METHOD, AND COMPUTER PROGRAM

(75) Inventor: Tadashi Morita, Tokyo (JP)

(73) Assignee: Sony Corporation (JP)

( * ) Notice: Subject to any disclaimer, the term of this patent is extended or adjusted under 35 U.S.C. 154(b) by 68 days.

(21) Appl. No.: 13/360,933

(22) Filed: Jan. 30, 2012

(65) Prior Publication Data

US 2012/0210141 A1 Aug. 16, 2012

(30) Foreign Application Priority Data

Feb. 10, 2011 (JP) ................ P2011-027652

(51) Int. Cl.
*G06F 9/00* (2006.01)

(52) U.S. Cl.
USPC ............... 713/194; 713/193; 713/168; 713/2; 725/5; 380/29; 380/44; 380/45; 380/201; 380/278; 717/140; 726/19; 726/25

(58) Field of Classification Search
USPC ........................................................ 713/194
See application file for complete search history.

(56) References Cited

U.S. PATENT DOCUMENTS

| | | | |
|---|---|---|---|
| 5,848,274 A * | 12/1998 | Hamby et al. ................ | 717/153 |
| 6,659,345 B2 | 12/2003 | Sukeda et al. | |
| 6,681,995 B2 | 1/2004 | Sukeda et al. | |
| 6,834,802 B2 | 12/2004 | Sukeda et al. | |
| 2004/0227652 A1 * | 11/2004 | Draxelmayr ................ | 341/120 |
| 2007/0003058 A1 * | 1/2007 | Fujiwara et al. ............. | 380/201 |
| 2007/0030964 A1 * | 2/2007 | Soda ............................ | 380/44 |
| 2007/0113084 A1 * | 5/2007 | Soda ............................ | 713/168 |
| 2007/0244951 A1 * | 10/2007 | Gressel et al. ............... | 708/252 |
| 2008/0301814 A1 * | 12/2008 | Takahashi ..................... | 726/25 |
| 2009/0080647 A1 * | 3/2009 | Mantin et al. ................. | 380/29 |
| 2009/0147947 A1 * | 6/2009 | Ingimundarson et al. ...... | 380/29 |
| 2009/0204825 A1 * | 8/2009 | Takashima .................... | 713/193 |
| 2010/0246829 A1 * | 9/2010 | McGrew et al. .............. | 380/278 |
| 2011/0067097 A1 * | 3/2011 | Park et al. .................... | 726/19 |
| 2011/0247027 A1 * | 10/2011 | Davis et al. ..................... | 725/5 |
| 2012/0128153 A1 * | 5/2012 | Golic ............................ | 380/45 |
| 2012/0159463 A1 * | 6/2012 | Druch et al. .................. | 717/140 |
| 2013/0024681 A1 * | 1/2013 | Gattegno ........................ | 713/2 |

FOREIGN PATENT DOCUMENTS

JP 2001-184472 A 7/2001

* cited by examiner

*Primary Examiner* — Beemnet Dada
*Assistant Examiner* — Sayed Beheshti Shirazi
(74) *Attorney, Agent, or Firm* — Lerner, David, Littenberg, Krumholz & Mentlik, LLP

(57) ABSTRACT

An information processing apparatus includes: a program executing unit which interprets and executes codes of a computer program created in a procedural language in an environment with a tamper resistant performance, wherein a security attribute and an authentication key are provided in units of functions in the computer program executed by the program executing unit, and wherein the program executing unit executes authentication processing with the authentication key for executing the function, which makes it possible to execute the function based on the security attribute.

18 Claims, 14 Drawing Sheets

| NAME(pname) | 401 |
| VARIABLE DEFINITION(value) | 402 |
| FUNCTION DEFINITION(function) | 403 |
| SECURITY ATTRIBUTE | 404 |

| 411 | 412 |
|---|---|
| car0 | cdr0 |
| car1 | cdr1 |
| car2 | cdr2 |
| car3 | cdr3 |
| car4 | cdr4 |
| car5 | cdr5 |
| car6 | cdr6 |
| car7 | cdr7 |
| car8 | cdr8 |
| car9 | cdr9 |

S FORMULA INPUT FOR DEFINING FUNCTION
(defun charge(x y)(progn(setq osaifu(+ osaifu x))(rplaca(car log) x))(rplacd(car log) y)(setq log(car log))))

INFORMATION PROCESSING APPARATUS, PROGRAM EXECUTION METHOD, AND COMPUTER PROGRAM

CROSS-REFERENCE TO RELATED APPLICATION

The present application claims priority from Japanese Patent Application No. JP 2011-027652 filed in the Japanese Patent Office on Feb. 10, 2011, the entire content of which is incorporated herein by reference.

BACKGROUND

The present disclosure relates to an information processing apparatus, a program execution method, and a computer program.

In recent years, a card provided with an IC (integrated circuit) and a non-contact antenna module capable of performing communication in a non-contact manner has widely been distributed. Such a card is called a non-contact IC card, for example, and can communicate with another apparatus in a non-contact manner. The non-contact communication using a non-contact IC card have been used for a transportation ticket, electronic money, an ID card, management of entering and leaving a room, and the like, and the use purpose thereof has been widened.

1A non-contact IC card capable of executing a program on an IC chip includes an OS (operation system) in accordance with the use purpose. Examples of the OS incorporated in such a non-contact IC card include MULTOS (Mel language), Java OS (Java (registered trademark) language), and the like, for example. Such an OS are realized by storing a virtual machine (VM) on a ROM and writing an execution code on a non-volatile memory.

SUMMARY

However, a program for calling an operable API to a file system is downloaded and defined according to the OS incorporated in such an IC card, the OS itself does not include functions of compiling and debugging, and the functions are not dynamically defined again during the usage of the OS.

According to MULTOS or Java OS, a container can be defined as a security fire wall, a program for each service can be downloaded to the container, and it is possible to execute a program by authenticating the container. However, protection of individual variables and functions in the program depends on the way of writing the program.

Since a plurality of development tools are used for developing an application program for an IC card, it is necessary to understand the tools, and it takes time to set up the tools. In addition, it is necessary to create and debug codes using the developing tools, finally downloading a program to an IC card, and perform final debugging on the IC card for the development process of the application program for an IC card. For this reason, there are problems in that the development process becomes complicated and that it takes time to correct the program if rework is necessary in the final debugging on the IC card.

In addition, it is necessary to exchange coded binary data to use a security function after downloading the application program to the IC card, and use a dedicated interpretation tool.

As a method of supplying an application program to an IC card, Japanese Unexamined Patent Application Publication No. 2001-184472 discloses a technique according to which it is possible to enhance general versatility and switch application programs (games). However, there is no mention in relation to the usage of a security function.

Thus, it is desirable to provide a new and improved information processing apparatus, a program execution method, and a computer program according to which it is possible to easily develop and mount an application program with the necessity of tight security.

According to an embodiment of the present disclosure, there is provided an information processing apparatus including: a program executing unit which interprets and executes codes of a computer program created in a procedural language in an environment with tamper resistant performance, wherein a security attribute and an authentication key are provided in units of functions in the computer program executed by the program executing unit, and wherein the program executing unit executes authentication processing with the authentication key for executing the function, which makes it possible to execute the function based on the security attribute.

A security attribute and an authentication key may further be provided in units of variables in the computer program executed by the program executing unit, and the program executing unit may execute authentication processing with the authentication key for referring to the variable and executing the function, which makes it possible to refer to the variable and execute the function based on the security attribute.

When a security attribute has been added to the function defined by the computer program, the program executing unit may be able to execute the function without authentication based on the security attribute setting for other functions and variables used inside the function by performing authentication with an authentication key designated for the function.

An access attribute to a symbol which defines the variable or the function, an authentication key version, and a pointer to an authentication key table may be set in the security attribute.

The information processing apparatus may be capable of changing definitions of the functions and the variables defined by the computer program executed by the program executing unit by performing authentication with a system key.

When a function formula defining the function is specified as a symbol, authentication with all authentication keys for functions and variables used in the symbol and the function may be necessary.

The information processing apparatus may further include a binary data conversion unit which encodes binary data delivered from an external apparatus in a predetermined format.

The binary data conversion unit may add a sign, which is not used in the predetermined format, to the head of the data obtained after converting the binary data delivered for the authentication processing.

The information processing apparatus may further include a storage unit with a non-volatility which stores variable definition and function definition used in the program executed by the program executing unit.

The computer program executed by the program executing unit may be able to a security attribute and an authentication key in units of variables and functions at arbitrary timing.

The security attribute may be set with a symbol definition specific command in response to a command which defines a variable or a function.

The security attribute may be set with a symbol definition specific command after defining a variable or a function with a command which defines a variable or a function.

Setting of the security attribute may further restrict reading and changing of information which defines a function.

At least the program executing unit may include tamper resistant performance.

The information processing apparatus may be an IC card with an IC chip incorporated therein.

According to another embodiment of the present disclosure, there is provided a program executing method including: interpreting and executing codes of a computer program created in a procedural language in an environment with a tamper resistant performance, wherein a security attribute and an authentication key are provided in units of functions in the computer program executed in the interpreting and the executing of codes, and wherein authentication processing with the authentication key is executed in the interpreting and the executing codes for executing the function, which makes it possible to execute the function based on the security attribute.

A security attribute and an authentication key may further be provided in units of variables in the computer program executed in interpreting and executing codes, and authentication processing with the authentication key may be executed in interpreting and executing codes for referring to the variable and executing the function, which makes it possible to refer to the variable and execute the function based on the security attribute.

According to still another embodiment of the present disclosure, there is provided a computer program including: causing a computer to interpret and execute codes of the computer program created in a procedural language in an environment with tamper resistant performance, wherein a security attribute and an authentication key are provided in units of functions in the computer program executed in causing a computer to interpret and execute codes, and wherein authentication processing with the authentication key is executed in causing a computer to interpret and execute codes for executing the function, which makes it possible to execute the function based on the security attribute.

A security attribute and an authentication key may further be provided in units of variables in the computer program executed in causing a computer to interpret and execute codes, and authentication processing with the authentication key may be executed in causing a computer to interpret and execute codes for referring to the variable and executing the function, which makes it possible to refer to the variable and execute the function based on the security attribute.

According to the present disclosure, a new and improved information processing apparatus, a program execution method, and a computer program according to which it is possible to easily develop and mount an application program with the necessity of tight security and securely incorporate a new application from a client PC via a network are provided as described above.

BRIEF DESCRIPTION OF THE DRAWINGS

FIG. 3 is an explanatory diagram showing a data structure which can be defined by a list processing module and called a symbol;

FIG. 4 is an explanatory diagram showing a configuration example of cons cells configuring a list structure;

DETAILED DESCRIPTION OF EMBODIMENTS

Figure 1:
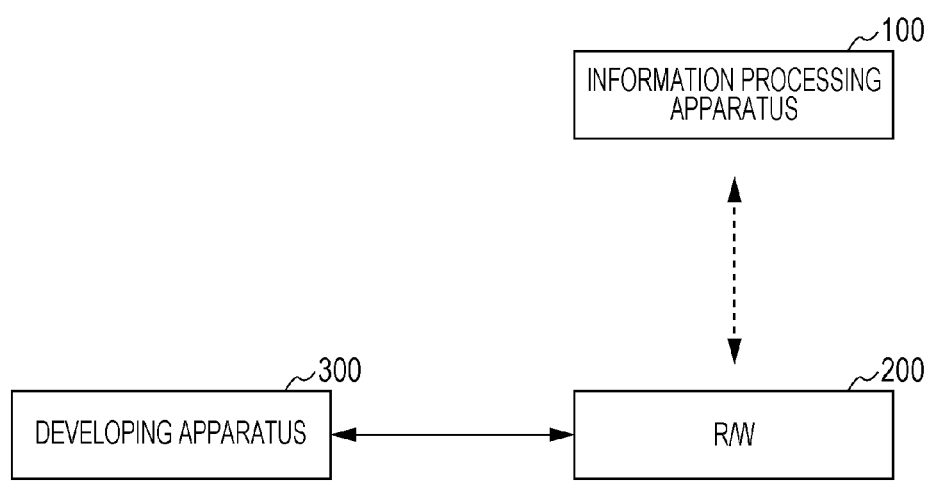
FIG. 1 is an explanatory diagram showing a configuration example of an information processing system according to an embodiment of the present disclosure.

Hereinafter, detailed description will be given of preferred embodiments of the present disclosure with reference to the accompanying drawings. In addition, same reference numerals will be given to components in this specification and the drawings, which have substantially the same functional configurations, and the description thereof will not be repeated.

The description will be given in the following order.
<1. Embodiment of the present disclosure>
[1-1. System configuration example]
[1-2. Hardware configuration example]
[1-3. Program structure example]
[1-4. Modified example of information processing apparatus]
[1-5. Comparison of application developing model]
[1-6. Hardware configuration of developing apparatus]
<2. Conclusion>
<1. Embodiment of the Present Disclosure>
[1-1. System Configuration Example]

First, description will be given of a system configuration example according to an embodiment of the present disclosure. FIG. 1 is an explanatory diagram showing a configuration example of an information processing system 1 according to an embodiment of the present disclosure. Hereinafter, description will be given of the configuration example of the information processing system 1 according to an embodiment of the present disclosure with reference to FIG. 1.

As shown in FIG. 1, the information processing system 1 according to an embodiment of the present disclosure includes an information processing apparatus 100, a reader writer (R/W) 200, and a developing apparatus 300.

The information processing apparatus 100 includes tamper resistance therein, and an IC chip provided with a proximal non-contact communication function is incorporated therein. The information processing apparatus 100 can be configured as an IC card, a mobile phone, a mobile terminal, or the like, for example, with such an IC chip incorporated therein. In addition, such an IC chip can exchange information with the reader writer 200 by executing proximal non-contact communication with a reader writer 200.

The reader writer 200 is provided so as to be connected mainly to an automatic ticket checker in a station, a cash register, or the like and executes proximal non-contact communication with the information processing apparatus 100 with an IC chip incorporated therein. By the reader writer 200 executing proximal non-contact communication with the information processing apparatus 100, the automatic ticket checker connected to the reader writer 200 can open a gate, or a cash register connected to the reader writer 200 can perform payment for goods, for example.

The developing apparatus 300 is an apparatus to be used for developing a computer program installed in the IC chip incorporated in the information processing apparatus 100. A user who creates the computer program to be installed in the IC chip can creates source code of the computer program to be installed and executed in the IC chip with the use of the developing apparatus 300. The source code of the computer program created by the developing apparatus 300 is transferred to the information processing apparatus 100 via the reader writer 200 connected to the developing apparatus 300 and installed in the IC chip incorporated in the information processing apparatus 100. The information processing apparatus 100 can interpret the source code of the computer program incorporated in the IC chip and execute the computer program.

The IC chip incorporated in the information processing apparatus 100 according to the embodiment is configured so as to be able to execute a program for which security setting is independently made for each of the variables and functions defined by the source code. In so doing, the IC chip incorporated in the information processing apparatus 100 according to this embodiment can prevent the program from being executed by an application or the like with no execution authority for the incorporated program, and therefore, it is possible to securely execute the program.

FIG. 1 shows a configuration in which the source code of the computer program created by the developing apparatus 300 is transferred to the information processing apparatus 100 via the reader writer 200 connected to the developing apparatus 300. However, it is not necessary to transfer the source code via the reader writer in order to install the computer program from the developing apparatus to the information processing apparatus according to the present disclosure, and the computer program may directly be transferred from the developing apparatus to the information processing apparatus.

The above description was made of the configuration example of the information processing system 1 according to an embodiment of the present disclosure with reference to FIG. 1. Next, description will be given of a hardware configuration example of the information processing apparatus 100 according to an embodiment of the present disclosure.

[1-2. Hardware Configuration Example]

Figure 2:
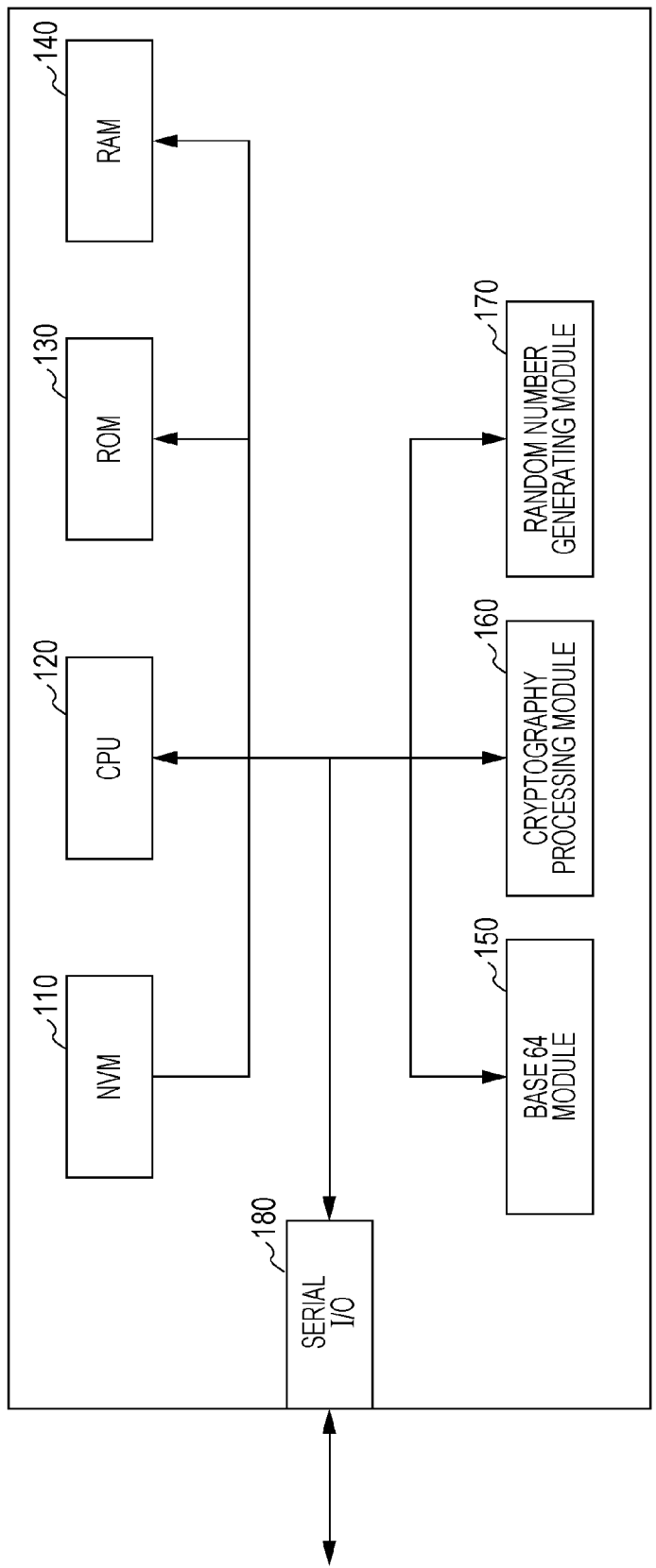
FIG. 2 is an explanatory diagram showing a hardware configuration of an information processing apparatus according to an embodiment of the present disclosure.

FIG. 2 is an explanatory diagram showing a hardware configuration of the information processing apparatus 100 according to an embodiment of the present disclosure. Hereinafter, description will be given of the hardware configuration of the information processing apparatus 100 according to an embodiment of the present disclosure with reference to Fig. 2.

The information processing apparatus 100 shown in FIG. 2 includes a hardware configuration, the entirety of which has tamper resistance as the chip incorporated in the IC card, for example. As shown in FIG. 1, the information processing apparatus 100 according to an embodiment of the present disclosure includes an NVM (Non Volatile Memory) 110, a CPU (Central Processing Unit) 120, a ROM (Read Only Memory) 130, a RAM (Random Access Memory) 140, a BASE 64 module 150, a cryptography processing module 160, a random number generating module 170, and a serial I/O interface 180.

On the NVM 110, incorporated functions written in advance in the ROM 130 are recorded as symbols at the time of initializing the information processing apparatus 100. In addition, the NVM 1110 also stores variables (user definition variable) and functions (user definition functions) defined by a user. Since NVM 110 can hold the recorded information even if the power is turned off, initialization is not performed again even when the power of the information processing apparatus 100 is activated again, and the registered symbols are held as they are.

The CPU 120 controls the operation of the information processing apparatus 100 and can execute an operating system by executing a reading order of the operating system software recorded in advance on the ROM 130. The CPU 120 can use the RAM 140 as a work area in the execution of the operating system. Here, examples of the operating system software recorded on the ROM 130 include software executed by interpreting a procedural programming language, and examples of such a programming language include LISP, Ruby, Python, and the like.

The ROM 130 of the information processing apparatus 100 according to this embodiment stores a security function added to a basic function of the procedural programming language, as an interpreter. With such a configuration, it is not necessary to compile in advance when an application program is installed in the information processing apparatus 100, and it is possible to perform debugging by the information processing apparatus 100 itself by which the application is used since the security function is added thereto. This results in shortening of the development steps, and it becomes possible to develop the application program in short time.

The BASE 64 module 150 is a module which performs BASE 64 conversion or reverse conversion on binary data for the communication with an apparatus provided outside the information processing apparatus 100 (hereinafter, simply referred to as an "external apparatus"). The information processing apparatus 100 according to this embodiment executes serial data communication via the serial I/O interface 180 as the communication with the external apparatus. According to this embodiment, when communication is performed with a list processing module from the outside of the information processing apparatus 100, the binary data is converted into a BASE 64 code by the BASE 64 module 150 such that all input data can be communicated as ASCII character sequences.

When cross authentication and communication thereafter are performed between the information processing apparatus 100 and the external apparatus (the reader writer 200, for example), the exchanged coded data in the binary format is subjected to the BASE 64 conversion by the BASE 64 module 150. The coded data may be exchanged by adding a sign (":", "~", or the like, for example) which is not used in the BASE 64 to the head and discriminating the coded data from general list processing formula.

For the serial data communication via the serial I/O interface 180, a carriage return sign is used as a separator of an input. The information processing apparatus 100 exchanges information with the external apparatus with the use of an ASCII code as a code used for the communication with the external apparatus. However, the information processing apparatus 100 subjects binary data to the BASE 64 conversion by the BASE 64 module 150 for exchanging binary data such as coded data. Then, the BASE 64 module 150 can add a character (sign), which is not used in the BASE 64, to the head for the BASE 64 conversion of the binary data as described above. It is possible for the CPU 120 to recognize the data converted by the BASE 64 module 150 as binary data when the CPU 120 executes the program, by adding a character (sign), which is not used in the BASE 64, to the head.

When the program executed by the CPU 120 is locked, and a symbol formula such as setting of a key to be used for locking and binary data are present at the same time, it is possible for the CPU 120 to recognize the difference between the symbol formula and the binary data when the CPU 120 executes the program, by allotting different characters (signs) to the symbol formula and the binary data.

The cryptography processing module 160 performs cryptography processing on the input data and output the input data with the use of the designated key, and performs decoding processing on the input coded data and outputs the input coded data with the use of the designated key.

The random number generating module 170 generates and outputs an appropriate random number based on a random number generating order from the outside (from the CPU 120, for example). The random number generated by the random number generating module 170 is used to determine whether or not a key of a counterpart device to be authenticated is correct by transmitting the random number from the information processing apparatus 100 to the counterpart device (the reader writer 200, for example) to be authenticated, allowing the counterpart device to generate a cryptography, and determining whether or not a result of decoding the cryptography replied from the counterpart device (the reader writer 200, for example) coincides with the random number transmitted from the information processing apparatus 100.

The serial I/O interface 180 includes a function of recognizing serial data from the external apparatus as a packet and extracting appropriate data, and a function of configuring data output from the inside of the information processing apparatus 100 to the external apparatus as packet data and outputting the packet data as serial data.

Since the information processing apparatus 100 with the configuration as shown in FIG. 2 has tamper resistance as a whole, it becomes difficult to analyze the insides of the device and the circuit from the outside. In relation to the computer program executed by the CPU 120, security setting is independently made for each of the variables and functions.

Although not shown in FIG. 2, the information processing apparatus 100 is provided with an antenna, a modulation and demodulation circuits, and the like for executing proximal non-contact communication with the reader writer 200.

The above description was given of the hardware configuration of the information processing apparatus 100 according to an embodiment of the present disclosure with reference to FIG. 2. Next, description will be given of a structure of the computer program to be executed by the information processing apparatus 100 shown in FIG. 2.

[1-3. Program Structure Example]

FIGS. 3 to 6 are explanatory diagrams showing structure examples of a computer program to be executed by the information processing apparatus 100 according to an embodiment of the present disclosure. Hereinafter, description will be given of the structure examples of the computer program to be executed by the information processing apparatus 100 according to an embodiment of the present disclosure with reference to FIGS. 3 to 6.

Although the following description will be given on the assumption that the language of the computer program to be executed by the information processing apparatus 100 is LISP, a language which can be used as a programming language is not limited to such an example, and any procedural programming language which can be configured such that security setting can independently be made for each of variables and functions as an extended capability or a standard capability is available according to the present disclosure.

The CPU 120 loads a list processing module which interprets and executes source code of the program which has been developed with the developing apparatus 300 and installed in the information processing apparatus 100. FIG. 3 is an explanatory diagram of a data structure which can define the list processing module and is called a symbol.

As shown in FIG. 3, a symbol 400 capable of defining the list processing module includes a name region 401, a variable defining region 402, a function defining region 403, and a security attribute region 404.

The name region 401 indicates a printable character table. On the name region 401, a variable name is stored when the symbol defines a variable, and a function name is stored when the symbol defines a function. In FIG. 3, the name region 401 is shown as "pname".

The variable defining region 402 stores a value of a simple variable when the symbol defines the simple variable and stores a value indicating a list when the symbol defines a list variable. In FIG. 3, the variable defining region 402 is shown as "value".

The function defining region 403 stores a function itself when the symbol stores a function. In FIG. 3, the function defining region 403 is shown as "function".

The security attribute region 404 stores information relating to the security attribute of the symbol. Examples of the attribute include a variable reading attribute, a variable changing attribute, and a function execution attribute, for example. The security attribute region 404 stores an access flag indicating access authority to the symbol and a value indicating the table in which an authentication key to access the symbol is stored.

In addition to the symbol 400 shown in FIG. 3, cells called cons cells which configure a list structure are sequentially defined. FIG. 4 is an explanatory diagram showing a configuration example of cons cells 410 which configure a list structure. As shown in FIG. 4, the cons cell 410 is an object including two pointers called a CAR slot 411 and a CDR slot 412. FIG. 4 shows car 0 to car 9 as a CAR slot 411 and cdr 0 to cdr 9 as a CDR slot 412. Of course, it is needless to say that each number of slots is not limited to such an example.

Figure 5:
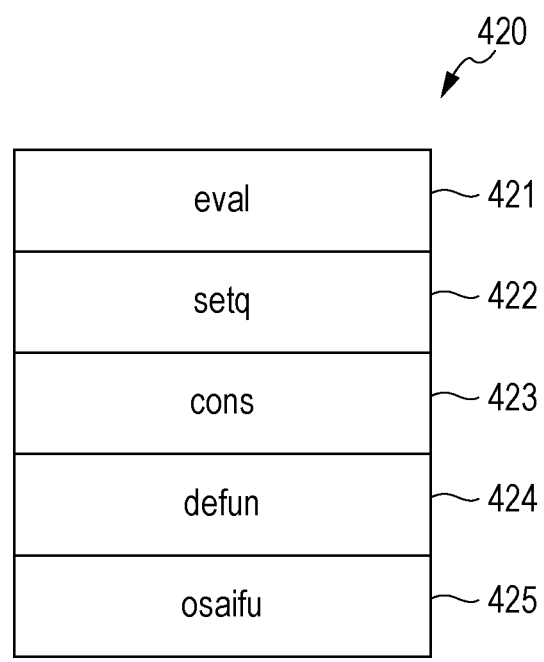
FIG. 5 is an explanatory diagram showing a structure example of a name storage table which stores names stored in a name region of a symbol.

A table which stores names stored in the name region 401 of the symbol 400 is also provided. FIG. 5 is an explanatory diagram showing a structure example of a name storage table 420 which stores the names stored in the name region 401 of the symbol 400. The name storage table 420 shown in FIG. 5 stores names of "eval", "setq", "cons", "defun", and "osaifu", each of which has a one-to-one correspondence relationship with the symbols as the actual conditions thereof. A reference numeral 421 represents a region in which the name "eval" is stored, a reference numeral 422 represents a region in which the name "setq" is stored, a reference numeral 423 represents a region in which the name "cons" is stored, a reference numeral 424 represents a region in which the name "defun" is stored, and a reference numeral 425 represents a region in which the name "osaifu" is stored. When a symbol name is input from the outside of the name storage table 420 to the name storage table 420, a symbol for the input symbol name, which is stored in the name storage table 420, is indicated and evaluated. In addition, "osaifu" is a variable representing a balance of electronic money when an electronic money function is incorporated in the information processing apparatus 100.

Figure 6:
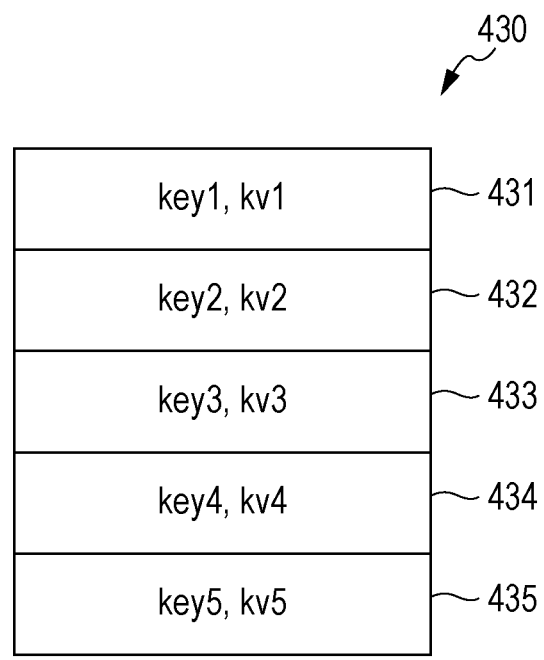
FIG. 6 is an explanatory diagram showing a structure example of an authentication key table which stores authentication keys.

In addition, a table corresponding to a value indicating a table storing an authentication key, which is stored in the security attribute region 404 of the symbol 400 is also provided. FIG. 6 is an explanatory diagram showing a structure example of an authentication key table 430 which stores an authentication key. FIG. 6 shows a state where the authentication key is managed with version numbers (kv1 to kv 5) in the authentication key table 430. Reference numerals 431, 432, 433, 434, and 435 denote region in which keys "key 1", "key 2", "key 3", "key 4", and "key 5" are stored, respectively.

The tables shown in FIGS. 3 to 6 are generated and stored in the NVM 110 prior to the execution of the computer program, which has been developed by the developing apparatus 300, in the information processing apparatus 100. In so doing, it is possible to maintain the state in which the contents of the tables are held as they are even if the power of the information processing apparatus 100 is turned off.

Figure 7:
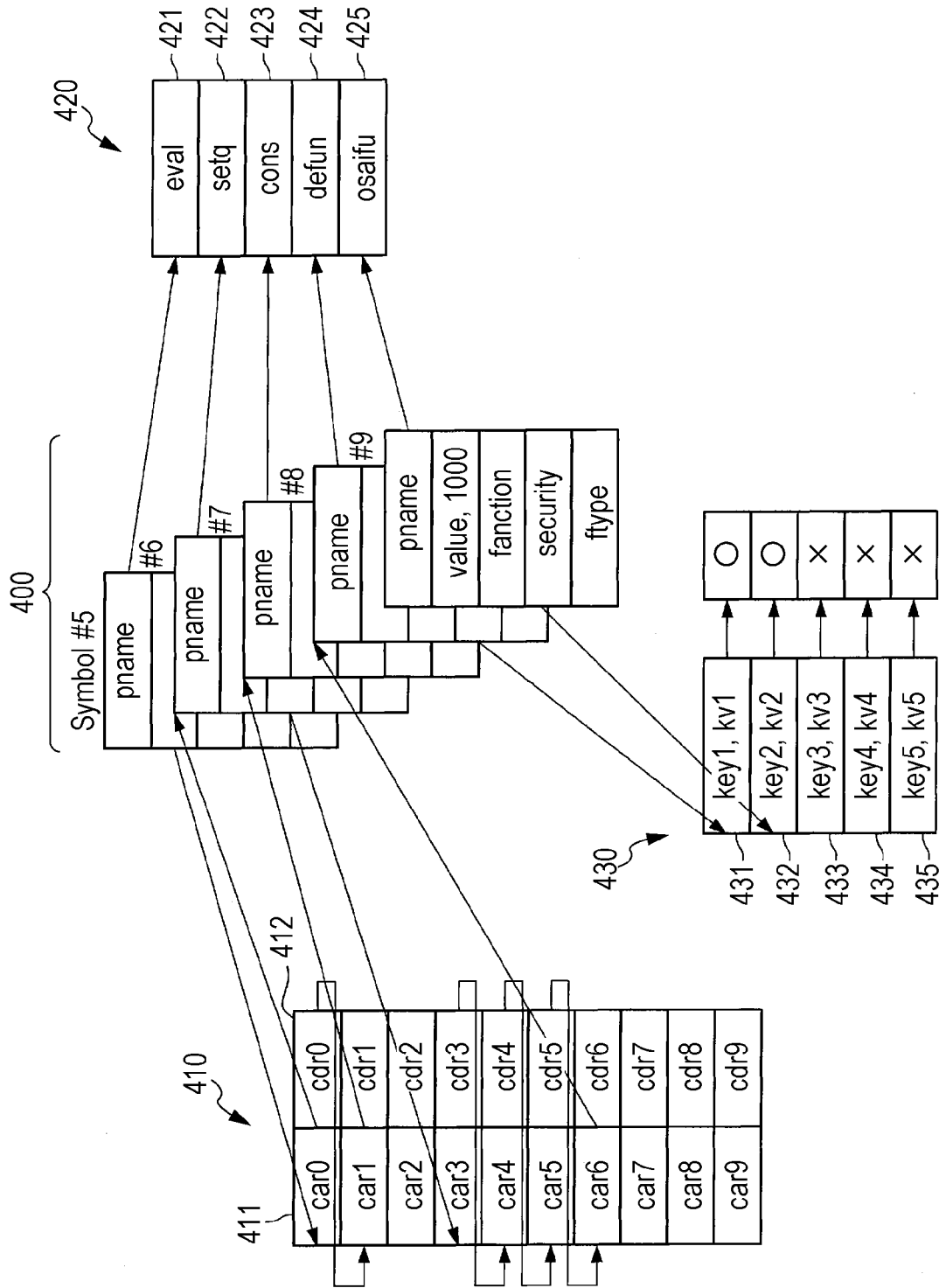
FIG. 7 is an explanatory diagram showing a correspondence relationship of the symbol shown in FIG. 3, the cons cell shown in FIG. 4, the name storage table shown in FIG. 5 and the authentication key table shown in FIG. 6.

FIG. 7 is an explanatory diagram showing a correspondence relationship of the symbol shown in FIG. 3, the cons cell shown in FIG. 4, the name storage table shown in FIG. 5, and the authentication key table shown in FIG. 6. As described above, the symbol has a region indicating a printable name table, a region indicating a value or a value list, a function attribute and a security attribute. The function attribute has a point indicating a type of a function and an actual condition of the function, and the security attribute has a pointer indicating a security flag, a key version, and a key. In addition, FIG. 7 shows a state in which a key "key1" shown by a reference numeral 431 and a key "key2" shown by a reference numeral 432 in the authentication key table 430 shown in FIG. 6 are used.

All of the symbols shown in FIG. 3, the cons cells shown in FIG. 4, the name storage table shown in FIG. 5, and the authentication key table shown in FIG. 6 are protected from improperly obtaining or falsifying values by being protected by the hardware with a tamper resistant function, such as the information processing apparatus 100 shown in FIG. 2.

As described above, a general structure of a list processing module is called a symbol and includes a pointer for numerical values or a list holding numerical values, a pointer for functions in the case of defining functions, and a pointer indicating a table storing printable character sequences.

In addition such components, pointers for tables holding the security attributes and two kinds of coding key information is added to the symbol according to this embodiment. A pointer for one key indicates a master key while a pointer for the other key indicates an access key (authentication key) of the symbol. The master key indicates a key to be authenticated in advance by a cross authentication function when the security attribute or the access key of the symbol is changed. When a security flag set for the symbol is added in evaluating or changing the contents of information held in the symbol or executing the function, it is necessary that authentication is made with one key added to the symbol in order to use the symbol. The other key indicates an authority authentication key to confirm authority when a key for the symbol is changed. In order to change access information, it is necessary to make authentication with the authority authentication key.

In addition, there are two pairs of pointers called a cons cell, which represents relationships between symbols as shown in FIG. 4, and each pointer has a structure indicating a symbol or a cons cell indicating another symbol.

An incorporated function is written in the ROM 130, and the incorporated function written in the ROM 130 is defined as a symbol created in the NVM 110 at the time of firstly activating the power of the information processing apparatus 100. At the time of activating the power thereafter, the symbols which have already been activated are not initialized.

The above configuration has a structure which similarly functions even when a new function is registered by a user.

The list processing module executed by the CPU 120 has a configuration in which it is possible to freely register a symbol and freely register a numerical value, a list, and a function to the symbol. In order to allow the registered symbol to have a security function, a code key and an access flag are registered in the symbol. For the list processing module executed by the CPU 120, a coding key called a system key is firstly set. It is possible to set a key and an access flag unique to the newly registered symbol only in the state corresponding to a mode in which cross authentication has been made with the system key (state corresponding to mode 2 in the following description). In addition, the computer program executed by the list processing module executed by the CPU 120 is configured to be able to change the definition of a variable and a function to be used only in a state corresponding to a mode in which cross authentication has been made with the system key.

The list processing module executed by the CPU 120 has a condition that authentication has already been made with all keys of the symbols to be used in the function for registering a function symbol. Thereafter, the list processing module is configured such that the authentication may simply be made with a function execution key when the registered function is used.

Figure 8:
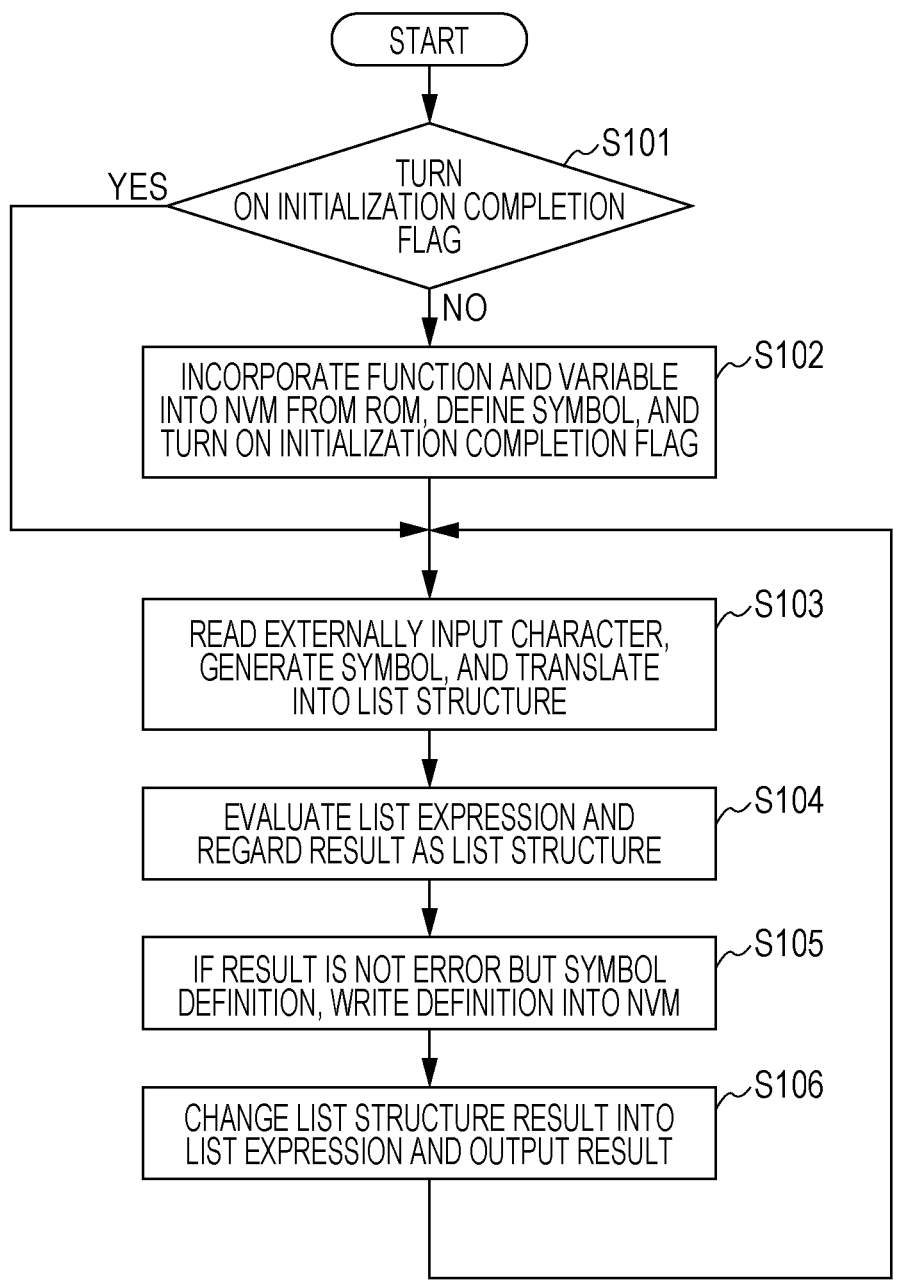
FIG. 8 is a flow diagram showing processing at the time of starting a list processing module executed by a CPU.
Figure 9:
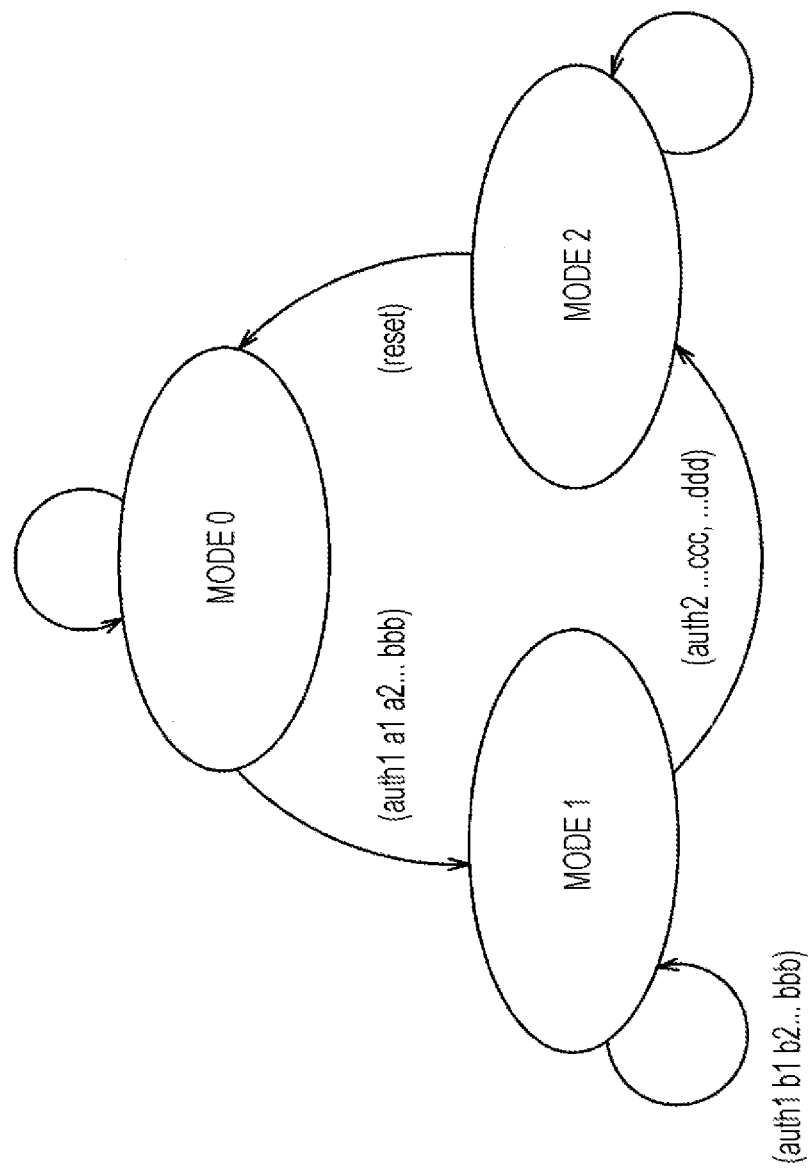
FIG. 9 is an explanatory diagram showing mode shift of a list processing module executed by a CPU.

Next, description will be given of processing at the time of starting the list processing module and the mode shift of the list processing module executed by the CPU 120. FIG. 8 is a flow diagram showing processing at the time of starting the list processing module executed by the CPU 120. In addition, FIG. 9 is an explanatory diagram showing mode shift of the list processing module executed by the CPU 120.

First, description will be given of the processing at the time of starting the list processing module by the CPU 120 with reference to FIG. 8. First, when the power of the information processing apparatus 100 is turned on, the list processing module is loaded on the CPU 120. Then, the list processing module executed by the CPU 120 firstly determines whether or not an initialization completion flag has been turned on (Step S101).

When the initialization completion flag has not been turned on as a result of the determination in Step S101, the list processing module incorporates functions and variables from the ROM 130 into the NVM 110 and defines a symbol. When the definition of the symbol is completed, the list processing module turns on the initialization flag (Step S102).

When the processing in Step S102 is completed, or when the initialization completion flag has been turned on as a result of the determination in Step S101, the list processing module then reads characters input from the outside of the information processing apparatus 100, generates a symbol, and executes translation into a list structure (Step S103).

When the processing in Step S103 is completed, the list processing module then evaluates a list formula and regards the evaluation result as a list structure (Step S104). Then, the list processing module writes symbol definition in the NVM 110 when the evaluation result of the list formula is not an error but symbol definition (Step S105). Thereafter, the list processing module changes the list structure result into a list formula and outputs the list formula (Step S106).

After changing the list structure result into the list formula and outputting the list formula in Step S106, the list processing module returns to Step S103, reads the characters input from the outside of the information processing apparatus 100, generates a symbol, and executes translation into a list structure. By the above series of operations, the list processing module executed by the CPU 120 can executes a computer program created by the developing apparatus 300 with the use of the functions and the variables incorporated in the NVM 110.

Next, description will be given of the mode shift of the list processing module executed by the CPU 120 with reference to FIG. 9. As shown in FIG. 9, the list processing module executed by the CPU 120 operates while shifting among mode 0, mode 1, and mode 2.

Mode 0 is a mode in which it is possible to refer to and change a variable and to execute a function with the use of an unlocked symbol, and communication is performed in plain text.

Mode 1 is a stage in the course of shifting from mode 0 to mode 2, namely a stage in the process of authentication, and in a state in which the list processing mode has been authenticated as a communication counterpart. In this mode, the list processing module and the communication counterpart have not yet reached the cross authentication state, and it is necessary for the list processing module to authenticate the communication counterpart in order to reach the cross authentication state. In addition, an "auth1" formula is used in FIG. 9 as a formula for authenticating the list processing module as the communication counterpart.

In addition, mode 2 is a mode indicating a state in which cross authentication has already been made between the list processing module and the communication counterpart with a coded key set in advance, which is called a system key, and it is possible to refer to a variable and to execute a function in accordance with the authentication flag of a symbol which has been authenticated and unlocked, and to cause the function in mode 0 to be operable. In addition, the computer program executed in the list processing module executed by the CPU 120 is configured such that it is possible to change the definition of a variable and a function to be used only in a state corresponding to a mode in which cross authentication has been made with a system key. Although communication is performed in a coded or encrypted text with the use of a session key, plain text in mode 0 is acceptable and/or it is also possible to receive plain text in mode 0. In addition, an "auth2" formula is used in FIG. 9 as a formula for the list processing module authenticating a communication counterpart.

If the list processing module executes a reset operation in the state of mode 2, the state returns to mode 0 in which it is possible to refer to and change a variable and to execute a function with the use of an unlocked symbol. In addition, a "reset" formula is used in FIG. 9 as a formula for shifting from mode 2 to mode 0.

The list processing module executed by the CPU 120 can executes an unlocked symbol, and release and execute a locked symbol by the operations in three modes including mode 0, mode 1, and mode 2.

Figure 10:
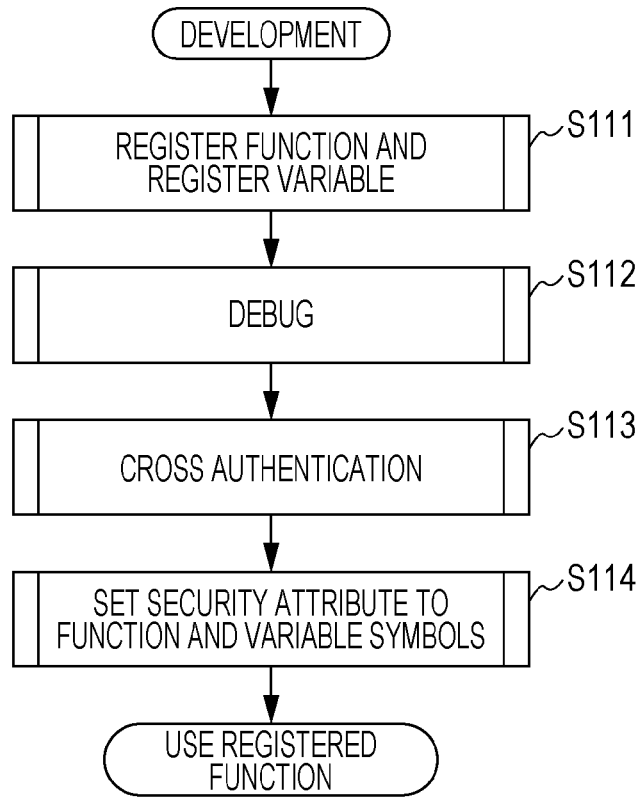
FIG. 10 is a flow diagram showing a symbol registering sequence and a security function activating sequence.
Figure 11:
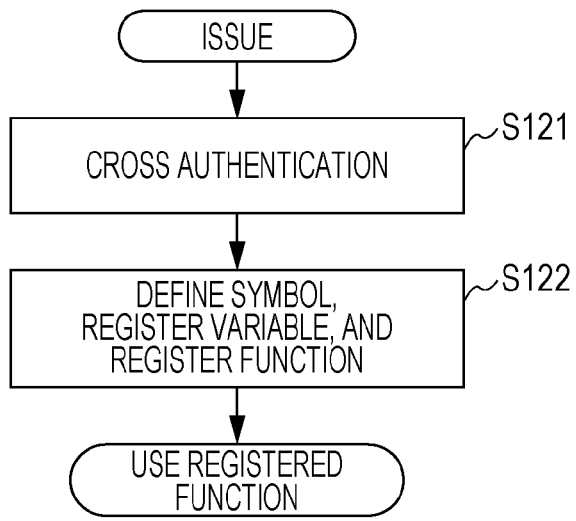
FIG. 11 is a flow diagram showing a symbol registering sequence and a security function activating sequence.

The above description was given of the mode shift of the list processing module executed by the CPU 120 with reference to FIG. 9. Next, description will be given of a symbol registering sequence and a security function activating sequence in the information processing apparatus 100 according to an embodiment of the present disclosure. FIGS. 10 and 11 are flow diagrams showing a symbol registering sequence and a security function activating sequence in the information processing apparatus 100 according to an embodiment of the present disclosure.

First, description will be given of the symbol registering sequence at the time of developing an application with reference to FIG. 10. First, an application is developed using the developing apparatus 300, and variables and functions to be used in the application are registered at the time of the development (Step S111). After registering the variables and functions to be used in the application, the developing apparatus 300 executes debugging processing in order to check whether or not the registered variables and functions correctly function (Step S112).

If there becomes no problem in the application by the debugging processing in Step S112, the application is installed from the developing apparatus 300 to the information processing apparatus 100. When the application is installed in the information processing apparatus 100, the list processing module is firstly made to execute cross authentication with a system key (Step S113). As describe above, it is possible to set a key and an access flag unique to a symbol only in the state of mode 2, in which cross authentication has been made with the system key.

When the cross authentication with the system key is completed, the application is installed from the developing apparatus 300 to the information processing apparatus 100, and a necessary security attribute is set to the symbols of the functions and the variables (Step S114). In so doing, it is possible to lock the symbols of the functions and the variables to be used in the application, and it becomes possible to allow only a person with authority of executing the functions and referring to the variables to execute the function, refer to the variables, and change values.

Next, description will be given of the flow when the application developed by the developing apparatus 300 is installed in the information processing apparatus 100 to issue the information processing apparatus 100 with reference to FIG. 11.

When the application developed by the developing apparatus 300 is installed in the information processing apparatus 100 to issue the information processing apparatus 100, the list processing module is firstly made to execute cross authentication with the system key (Step S121). When the cross authentication with the system key is completed, the list processing module is then made to read the program developed by the developing apparatus 300, define symbols, register variables, and register functions (Step S122). The list processing module does not read the program without performing the cross authentication in Step S121. The list processing module can define symbols for which security setting has been made, register variables, and register functions by performing the cross authentication in Step S121, and thereby to execute the functions, refer to the variables, and change the values.

Figure 12:
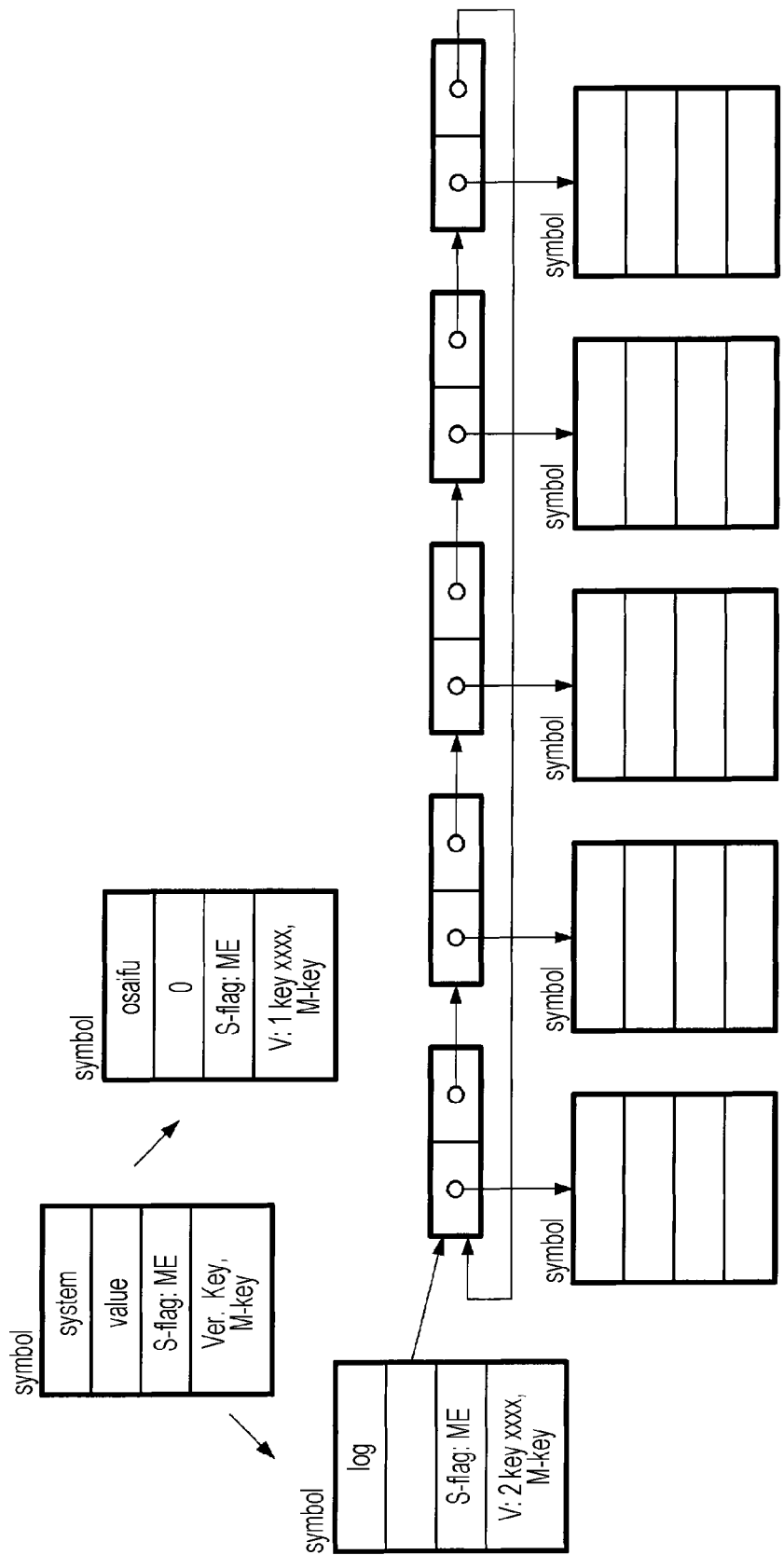
FIG. 12 is an explanatory diagram showing a list structure example of a variable for which security setting has been made.

Next, description will be given of a lost structure example of a variable, which can be referred to by the list processing module executed by the information processing apparatus 100 according to an embodiment of the present disclosure, for which security setting has been made. FIG. 12 is an explanatory diagram showing a list structure example of a variable for which security setting has been made.

After the authentication with the system key, a symbol is generated, and a security flag, a key version, and a key are set. Three kinds of security attributes (S-flag) can be designated. In FIG. 12, X represents function executing lock, M represents content updating lock, and E represents content reading lock, respectively. The function executing lock represents that the execution of the function is not available without the authentication with the authentication key, the content updating lock represents that the updating of the variable is not available without the authentication with the authentication key, and the content reading lock represents that the reference to the value of the variable is not available without the authentication with the authentication key. FIG. 12 shows a list structure example of two variables including "osaifu" and "log". Hereinafter, description will be given of the list structures of the two variables "osaifu" and "log".

The variable "osaifu" shown in FIG. 12 is a variable which stores balance of electronic money. A variable name (pname) of "osaifu" is designated for the variable "osaifu", and 0 is designated for the value (value) which stores the balance of the electronic money. In addition, content updating lock (M) and the content reading lock (E) are designated as the security attributes for the variable "osaifu". In so doing, the reference and the change of the content is not available without the authentication with the authentication key in relation to the value of the variable "osaifu".

In addition, information relating to a pointer to a master key, a version of an access key for accessing the variable "osaifu", and a pointer to the access key is stored on the variable "osaifu". As described above, the master key is a key for which authentication by the cross authentication function is necessary in advance when the security attributes and the access key of the symbol (the variable "osaifu" in this example). FIG. 12 shows a state in which the version of the access key for accessing the variable "osaifu" is 1 and the information relating to the pointer to the access key is stored.

The variable "log" shown in FIG. 12 is a variable which stores the execution result of the function. "log" is designated as a variable name (pname) for the variable "log". In addition, the value (value) which stores the function execution result has a cyclic configuration. In the configuration shown in FIG. 12, the results of executing the function five times are stored on the variable "log". In addition, the generation of the cyclic file is set with the use of the function incorporated in the list processing function.

Then, the content updating lock (M) and the content reading lock (E) are designated as the security attributes for the variable "log". In so doing, the reference and the change of the content are not available for the value of the variable "log" without the authentication with the authentication key. FIG. 12 shows a state in which the version of the access key for accessing the variable "log" is two and the information relating to the pointer to the access key is stored.

In addition, "System" shown in FIG. 12 has an original authority of the module. If a key is set for "System, preliminary authentication is necessary for generating each function and variable object. On the other hand, if a key is not set for "System", preliminary authentication is not necessary, and "System" becomes a variable holding a system code and module information in Felica (registered trademark) which is one of the techniques for a non-contact type IC card, for example.

Figure 13:
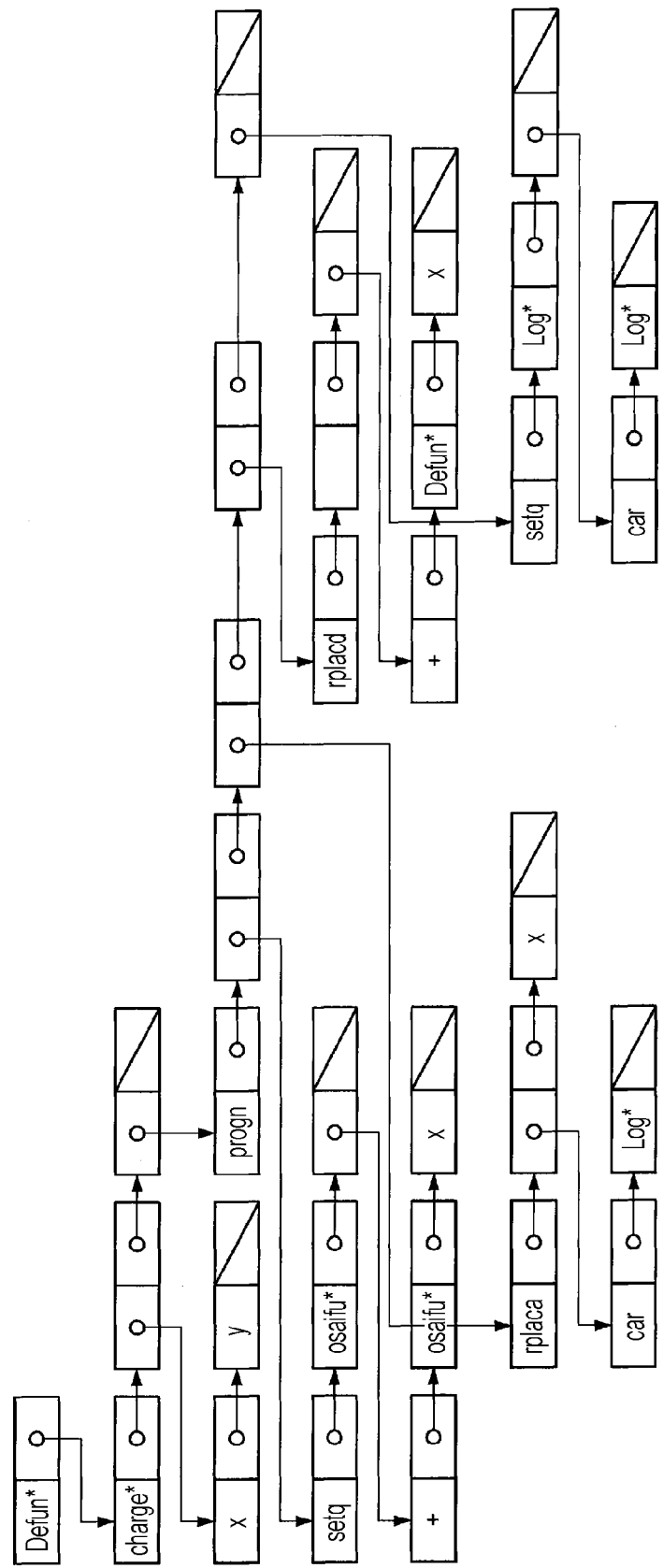
FIG. 13 is an explanatory diagram showing a list structure example of a function for which security setting has been made.

Next, description will be given of a list structure of a function, which can be referred to by the list processing module executed by the information processing apparatus 100 according to an embodiment of the present disclosure, for which security setting has been made. FIG. 13 is an explanatory diagram of a list structure example of a function for which security setting has been made.

FIG. 13 shows a list structure example of a function "charge". Hereinafter, description will be given of the list structure of the function "charge".

The S formula for defining the function "charge" is as shown in FIG. 13. Here, the S formula is based on a logical description method used in LISP and is used for defining a symbol. With the S formula, the function "charge" executes processing of adding a value designated by an argument x to the value of the variable "osaifu" shown in FIG. 12. In addition, the S formula uses two security-locked variables "osaifu" and "log" shown in FIG. 12.

"charge*", "osaifu*", and "log*" shown in FIG. 13 are security-locked functions and variables. Accordingly, preliminary authentication is necessary for all the security-locked functions and variables in order to execute the function "charge".

As described above, preliminary authentication is necessary for the two security-locked variables "osaifu" and "log" in order to execute the function "charge". However, a person who has been authorized to execute the function "charge" is considered to have been authorized to refer to and change the values of the variables "osaifu" and "log" as well due to the shift of the authority, and it is possible to execute the function "charge" by the authentication with a key set for the function "charge" and it is not necessary to repeat the authentication for the variables "osaifu" and "log".

The above description was made of the list structure examples of the functions for which security setting has been made. As described above, the list processing module executed by the CPU 120 of the information processing apparatus 100 according to this embodiment can refer to the security-locked variables and executes the security-locked functions. In addition, it is possible to uniquely set a security attribute for each of the variables referred to and the functions executed by the list processing module executed by the information processing apparatus 100 and to security-lock the variables and the functions.

In so doing, it is possible to uniquely perform security setting for each of the variables and functions used in the program executed by the list processing module executed by the information processing apparatus 100, which results in a tight security implementation. In relation to the list processing module executed by the information processing apparatus 100, preliminary compile is not necessary since a security function is added in addition to the basic function of the interpreter. In addition, it is possible to perform debugging in the information processing apparatus 100 which is actually used. Moreover, it is possible to directly and dynamically define variables and functions in the NVM 110, a program can flexibly be developed by dynamically and directly defining functions and variables in the NVM 110. Furthermore, reading and changing of the function defining information are also limited by sets of the security attributes as well as the limitation of the function execution, and it is possible to protect the program from leakage or falsification of the function defining information due to attack from the outside.

The security-locked variables and functions are not available until the authentication with a corresponding authentication key is performed. In relation to functions, preliminary authentication for the security-locked variables and functions, which are used as arguments used inside by the functions, is necessary for defining the functions. However, the variables and the functions which are used as arguments used inside are available with no conditions when the functions after the definition are used. Therefore, it is not necessary to prepare all authentication keys and perform authentication every time the functions are executed, and the operation thereof is facilitated.

A specific example will be described. When security setting is performed on the variable "osaifu", reading and the changing of the value stored on the variable "osaifu" are available only in the state in which cross authentication is performed with a key designated for the variable "osaifu".

On the other hand, when security setting is performed on the variable "charge" which changes the value stored on the variable "osaifu", for example, the execution of the function "charge" is available only in the state in which cross authentication is performed with a key designated for the function "charge. In this case, the reading and the changing of the value stored on the variable "osaifu" are not available if the reading and the changing of the value stored on the variable "osaifu" are not authenticated while the execution of the function "charge" is authenticated. By uniquely performing security setting on each of the variables and functions, flexible operation becomes possible. In addition, it is not necessary to prepare authentication keys for all variables used inside and perform authentication every time the functions are executed, and therefore, the operation is facilitated.

The security functions of the variables and the functions used in the program executed in the list processing module executed by the information processing apparatus 100 may be implemented at arbitrary timing. Accordingly, the security functions are mounted on the variables and the functions in the developing apparatus 300 after performing sufficient debugging on the program developed by the developing apparatus 300, and further debug in the state in which the security functions are mounted becomes possible.

The binary data coded by the cryptography processing module 160 is converted into printable characters before transmission and exchanged. In so doing, the binary data coded by the cryptography processing module 160 can be operated by another application such as a web application or the like.

[1-4. Modified Example of Information Processing Apparatus]

Figure 14:
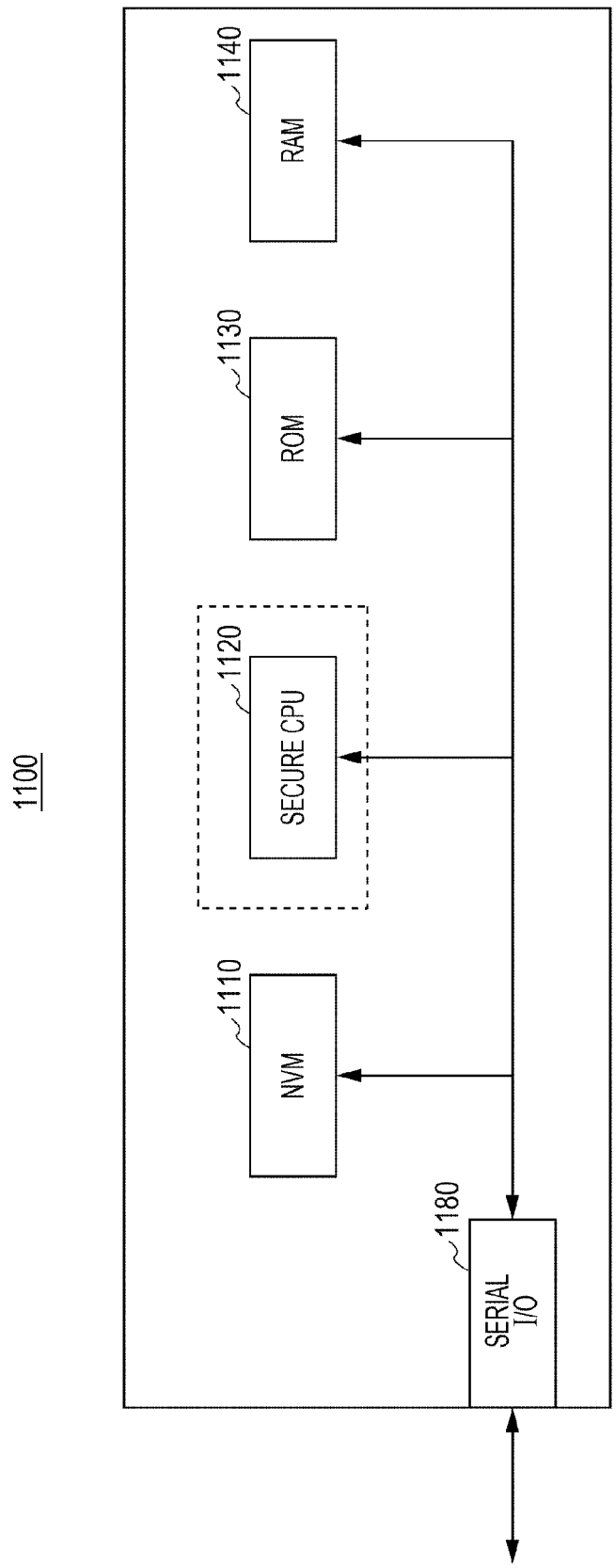
FIG. 14 is an explanatory diagram showing a hardware configuration of an information processing apparatus according to a modified example.

Next, description will be given of a modified example of an information processing apparatus according to an embodiment of the present disclosure. FIG. 14 is an explanatory diagram showing a hardware configuration of an information processing apparatus 1100 according to a modified example of the information processing apparatus of an embodiment of the present disclosure. Hereinafter, description will be given of the hardware configuration of the information processing apparatus 1100 with reference to FIG. 14.

The information processing apparatus 100 shown in FIG. 2 has tamper resistance as a whole of the apparatus. As shown in FIG. 14, the information processing apparatus 1100 includes a NVM 1110, a secure CPU 1120, a ROM 1130, a RAM 1140, and a serial I/O 1180. The information processing apparatus 1100 is different from the information processing apparatus 100 shown in FIG. 2 in that the information processing apparatus 1100 does not have tamper resistance as a whole of the apparatus and only the secure CPU 1120. A configuration is also applicable as described above in which a part including the CPU is protected by a tamper resistant function and communication and exchanged data with the other functions are protected by a cryptographic technology. In addition, another configuration is also applicable in which the information processing apparatus 100 shown in FIG. 2 is provided at a location with a tamper resistant environment, in which variables are referred to and the function attributes are executed.

On the NVM 1110, incorporated functions written in advance in the ROM 1130 are recorded as symbols at the time of initializing the information processing apparatus 400. In addition, the NVM 1110 also stores variables (user definition variable) and functions (user definition functions) defined by a user. Since the NVM 1110 can hold the recorded information even when the power is turned off, initialization is not repeated when the power of the information processing apparatus 1100 is activated, and the registered symbols are held as they are.

The secure CPU 1120 controls operations of the information processing apparatus 1100 and can execute an operating system by executing a reading order of the operating system software recorded in advance in the ROM 1130. The CPU 1120 can use the RAM 1140 as a work area when the operation system is executed. Here, the operation system software recorded in the ROM 1130 is software which can interpret and execute a procedural programming language, for example, and examples of such a programming language include LISP, Ruby, Python, and the like as described above.

In addition, the secure CPU 1120 also includes a function of the cryptography processing module 160 shown in FIG. 2. The secure CPU 1120 includes functions of holding a coding key therein and coding a program code to be written in the ROM 1130 and the data to be recorded on the NVM 1110 and the RAM 1140. Moreover, the secure CPU 1120 also includes a function of the random number generating module 170 shown in FIG. 2 and can generate an appropriate random number based on a random number generating order.

The serial I/O interface 1180 includes function of recognizing serial data from an external apparatus as a packet and extracting appropriate data, and configuring data to be output from the inside of the information processing apparatus 1100 to the external apparatus as packet data and outputting the data as serial data.

The above description was made of the hardware configuration of the information processing apparatus 400 with reference to FIG. 14. An apparatus such as the information processing apparatus 1100 can execute a program while security for each of variables and functions is independently secured by causing a part with tamper resistance to execute the aforementioned list processing module if not the entire apparatus but a part of the apparatus includes tamper resistance.

The above description was given of the information processing apparatus capable of facilitating the development and the execution of a secure application by adding security attributes to the list processing module and further protecting the apparatus with a tamper resistant function. Here, description will be given of differences between an application development model in the related art and the application development model of the information processing system according to an embodiment of the present disclosure.

[1-5. Comparison of Application Developing Model]

Figure 15:
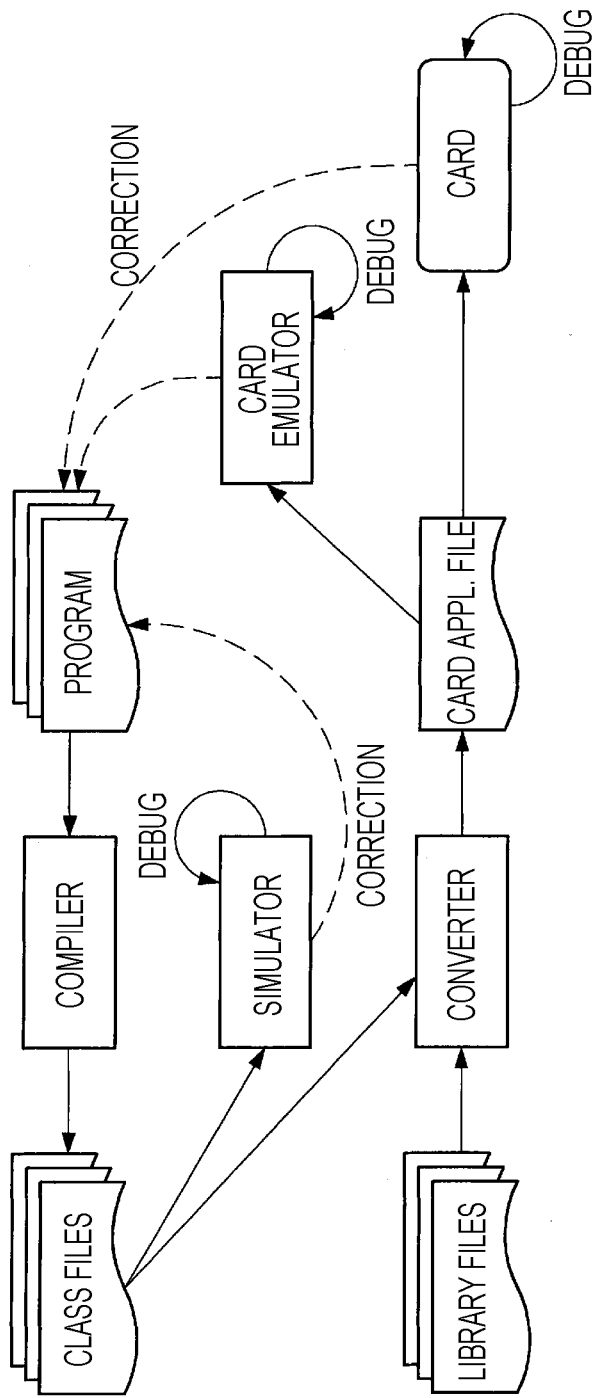
FIG. 15 is an explanatory diagram showing an application developing model in the related art.

FIG. 15 is an explanatory diagram showing an application development model in the related art. The following description will be given of the application development model in the related art with reference to FIG. 15. First, when a program to be executed by an IC card is created, it is necessary to subject the program to a compiler to generate a class file. Thereafter, debugging of the class file is performed with the use of a simulator, and it is necessary to correct the created program if a bug is present.

The class file for which debugging is completed is subjected to a converter along with a library file to create an application file to be executed by a device with an IC chip incorporated therein such as an IC card or the like. Then, the created application file is incorporated in a card emulator which emulates an operation environment of the IC card, and debugging is performed on the card emulator. If a bug is present in this stage, it is necessary to correct the program, perform the compile into the class file, and perform the conversion into the application file.

When the debugging on the card emulator is completed, the application file is finally incorporated in the IC card. Then, the debugging on the IC card is performed, and it is necessary to correct the program, perform the compile into the class file, perform the conversion into the application file, and perform the debugging on the card emulator if bug is present in this stage.

As described above, it is necessary to repeat the creation and the debugging of the program in a plurality of stages according to the application development mode in the related art, and a large number of steps are necessary to implement the competed program onto the tamper resistant environment such as an IC chip or the like.

Figure 16:
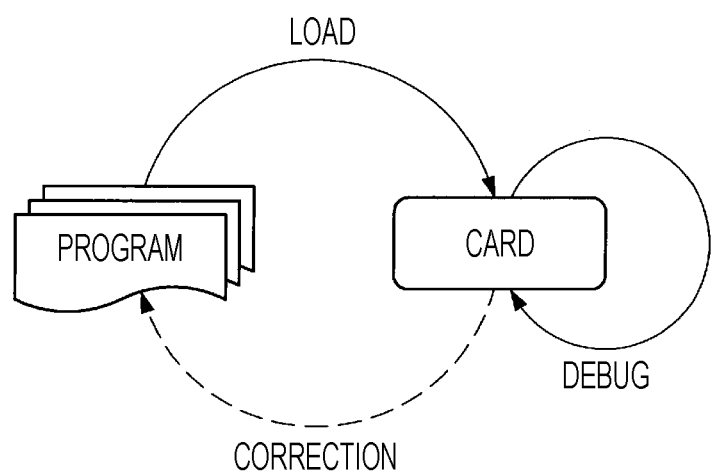
FIG. 16 is an explanatory diagram showing an application developing model by an information processing system according to an embodiment of the present disclosure.

FIG. 16 is an explanatory diagram showing an application development mode by the information processing system according to an embodiment of the present disclosure. The following description will be given of the application development mode by the information processing system according to an embodiment of the present disclosure with reference to FIG. 16. First, a program to be executed by the information processing apparatus 100 is developed by the developing apparatus 300 and incorporated into the information processing apparatus 100 as it is. It is possible to perform security setting in advance on variables and functions to be used in the program during the development by the developing apparatus 300, or otherwise, it is also possible to set such a security function for the variables and the functions to be used in the program later.

The information processing apparatus 100 with the program incorporated therein executes the program developed by the developing apparatus 300 by the list processing module executed in the tamper resistant environment. At this time, preliminary compile of the program code, which is necessary in the application development model in the related art, is not necessary, and it is possible to directly execute the program by the information processing apparatus 100. In so doing, the information processing apparatus 100 can securely execute the program without the program code or data used in the program being snooped upon from the outside.

When the presence of the bug is observed in the execution of the program by the information processing apparatus 100, debugging is performed on the program by the developing apparatus 300. However, it is understood that the increased number of steps for the debugging is significantly smaller than that in the application development mode in the related art shown in FIG. 15. Therefore, it is possible to greatly reduce the number of development steps for implementing the completed program onto the tamper resistant environment such as an IC chip or the like as compared with the application development mode in the related art and thereby to easily and securely develop an application according to the application development model by the information processing system according to an embodiment of the present disclosure.

According to the application development model by the information processing system according to an embodiment of the present disclosure, it is also possible to perform security setting in advance on variables and functions at the time of creating the program and cause the information processing apparatus 100 to execute the program. However, another operation is also applicable in which the information processing apparatus 100 is made to execute the program in the state in which the security setting has not been performed on the variables and the functions, the program is installed in the information processing apparatus 100 if there is no problem in the operation, and the security setting is performed on the installed program.

[1-6. Hardware Configuration of Developing Apparatus]

Figure 17:
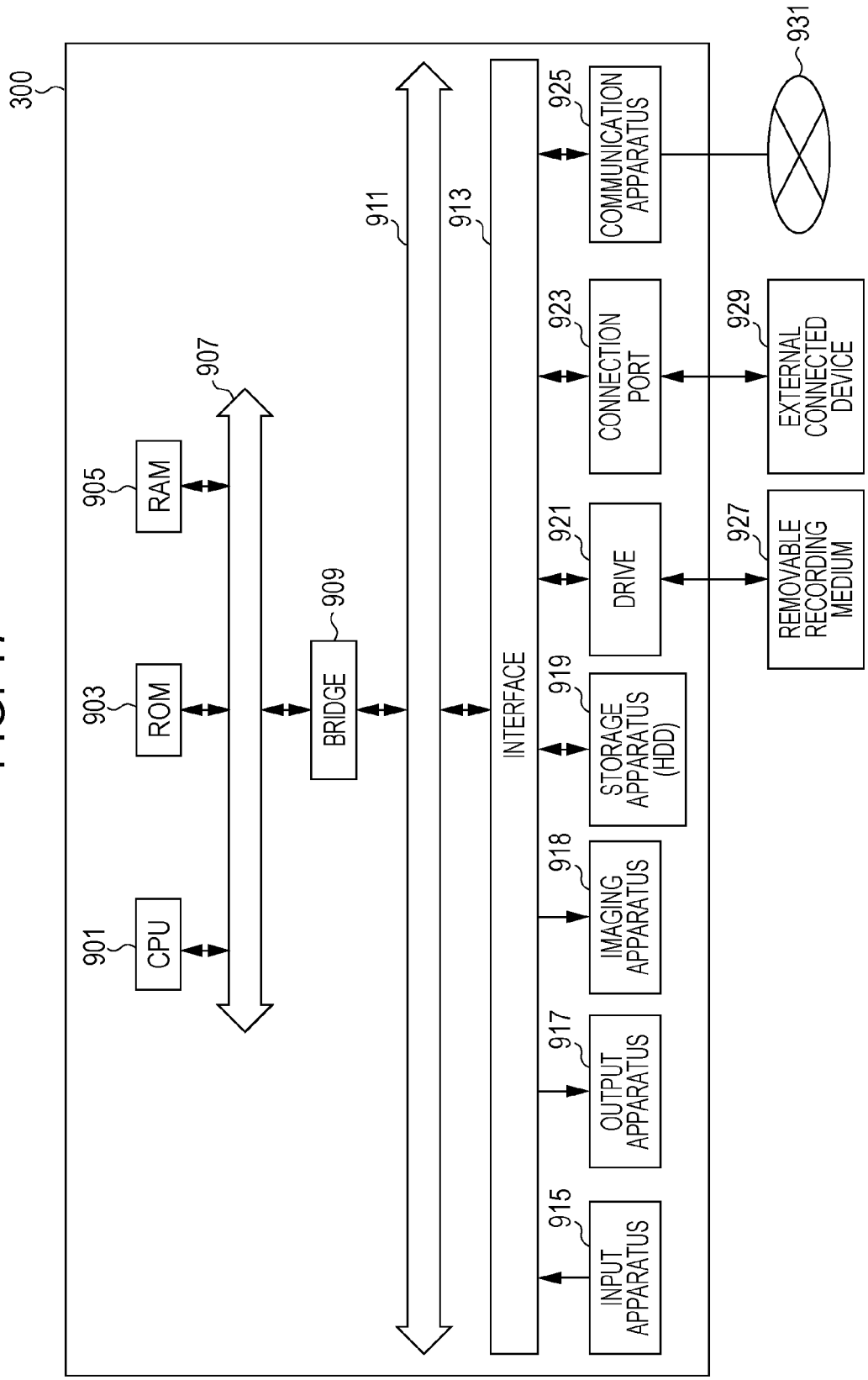
FIG. 17 is a block diagram illustrating a hardware configuration of a developing apparatus according to an embodiment of the present disclosure.

Next, detailed description will be given of a hardware configuration of the developing apparatus 300 according to an embodiment of the present disclosure with reference to FIG. 17. FIG. 17 is a block diagram illustrating the hardware configuration of the developing apparatus 300 according to an embodiment of the present disclosure.

The developing apparatus 300 mainly includes a CPU 901, a ROM 903, a RAM 905, a host bus 907, a bridge 909, an external bus 911, an interface 913, an input apparatus 915, an output apparatus 917, an imaging apparatus 918, a storage apparatus 919, a drive 921, a connection port 923, and a communication apparatus 925.

The CPU 901 functions as a computation processing apparatus and a control apparatus and controls the entire or a part of the operations in the developing apparatus 300 based on various programs recorded on the ROM 903, the RAM 905, the storage apparatus 919 or a removable recording medium 927. The ROM 903 stores programs, computation parameters, and the like executed by the CPU 901. The RAM 905 temporary stores the programs used in the execution by the CPU 901 and the parameters and the like which appropriately changes in the execution of the programs. These components are connected to each other via the host bus 907 configured by an internal bus such as a CPU bus or the like.

The host bus 907 is connected to the external bus 911 such as a PCI (Peripheral Component Interconnect/Interface) via the bridge 909.

The input apparatus 915 is an operation unit such as a mouse, a keyboard, a touch panel, a button, a switch, a lever, or the like which is operate by a user. In addition, the input apparatus 915 may be a remote control unit (a so-called remote controller) using infrared rays or other electric waves or an external connected device 929 such as a mobile phone, a PDA, or the like corresponding to the operation of the developing apparatus 300. Moreover, the input apparatus 915 includes an input control circuit or the like which generates an input signal based on information input by the user with the use of the operation unit and outputs the input signal to the CPU 901. The user of the developing apparatus 300 can input various data items or order processing operations with respect to the developing apparatus 300 by operating the input apparatus 915.

The output apparatus 917 is configured by an apparatus such as a display apparatus such as a CRT display apparatus, a liquid crystal display apparatus, a plasma display apparatus, an EL display apparatus, a lamp, or the like, a sound output apparatus such as a speaker, a headphone, or the like, a printer, a mobile phone, a facsimile, or the like which can visual or aurally notify the use of the obtained information. The output apparatus 917 outputs result obtained by various kinds of processing executed by the developing apparatus 300, for example. Specifically, the display apparatus displays the results obtained by the various kinds of processing performed by the developing apparatus 300 as a text or an image. On the other hand, the sound output apparatus converts an audio signal including reproduced sound data, acoustic data, and the like into an analog signal and outputs the analog signal.

The imaging apparatus 918 is provided on the upper part of the display apparatus, for example, and can take a stationary image or a moving image of the user of the developing apparatus 300. The imaging apparatus 918 is provided with a CCD (Charge Coupled Device) image sensor or a CMOS (Complementary Metal Oxide Semiconductor) image sensor and can take a stationary image or a moving image by converting light collected by a lens into an electric signal.

The storage apparatus 919 is an apparatus for storing data, which is configured as an example of the storage unit of the developing apparatus 300, and is configured by a magnetic storage device such as an HDD (Hard Disk Drive), a semiconductor storage device, an optical storage device, a magneto-optical storage device, or the like, for example. The storage apparatus 919 stores programs and various data items executed by the CPU 901, and the acoustic signal data, the image signal data, or the like obtained from the outside.

The drive 921 is a reader writer for a recording medium and installed in or externally attached to the developing apparatus 300. The drive 921 reads information recorded on the removable recording medium 927 such as a magnetic disk, an optical disc, an magneto-optical disc, a semiconductor memory, or the like which is mounted thereon, and outputs the information to the RAM 905. In addition, the drive 921 can also write a record in the removable recording medium 927 such as a magnetic disk, an optical disc, a magneto-optical disc, a semiconductor memory, or the like mounted thereon. The removable recording medium 927 is a DVD medium, a Blu-ray medium, a CompactFlash (CF) (registered trademark), a memory stick, an SD memory card (Secure Digital memory card), or the like, for example. In addition, the removable recording medium 927 may be an IC card (Integrated Circuit card), an electronic device, or the like with a non-contact type IC chip mounted thereon, for example.

The connection port 923 is a port which directly connects a device to the developing apparatus 300, and the examples thereof include a USB (Universal Serial Bus) port, an IEEE 1394 port such as an i. Link or the like, SCSI (Small Computer System Interface) port, an RS-232C port, an optical audio terminal, an HDMI (High-Definition Multimedia Interface) port, and the like. By connecting the external connected device 929 to the connection port 923, the developing apparatus 300 directly obtains acoustic signal data or the image signal data from the external connected device 929 or provides the acoustic signal data or the image signal data to the external connected device 929.

The communication apparatus 925 is a communication interface configured by a communication device or the like to be connected to a communication network 931, for example. Examples of the communication apparatus 925 include a wired or wireless LAN (Local Area Network), Bluetooth, a communication card for WUSB (Wireless USB), a router for optical communication, a router for ADSL (Asymmetric Digital Subscriber Line), a modem for various kinds of communication, and the like. The communication apparatus 925 can exchange signals and the like with the Internet or another communication device based on a predetermined protocol such as TCP/IP or the like, for example. In addition, the communication network 931 connected to the communication apparatus 925 is configured by a network or the like connected in a wired or wireless manner, and may be the Internet, a domestic LAN, an infrared communication, a radio wave communication, a satellite communication, or the like.

The user can develop a computer program to be executed by the information processing apparatus 100 with the use of such a developing apparatus 300. The computer program created with the use of the developing apparatus 300 can be installed in the information processing apparatus 100 via the reader writer 200 connected to the developing apparatus 300, for example.

<2. Conclusion>

As described above, it is possible to realize a programming operating system which facilitates development of a secure application by configuring the list processing module to be executed by the information processing apparatus 100 such that security can independently be set for each of variables and functions and protecting the list processing module with a tamper resistant function, according to an embodiment of the present disclosure. Since security setting can uniquely be performed on each of the variables and functions to be used in the program, it is possible to easily realize the implementation of tight security.

The list processing module is provided with a basic function as an interpreter, and preliminary compile is not necessary when the information processing apparatus 100 is made to execute the program, and it is possible to perform debugging on the IC chip itself to be used for executing the program, by further adding a security function. Accordingly, the number of development steps is smaller than that in the application development model in the related art, and it is possible to develop an application in shorter time. In addition, it is possible to dynamically and directly define variables and functions in the non-volatile memory provided in the information processing apparatus 100, which makes it possible to flexibly develop an application.

The security-locked variables and functions used in the application executed by the information processing apparatus 100 according to an embodiment of the present disclosure are not available until authentication is done with the respectively set authentication keys. Therefore, the security-locked variables and functions used by a function as arguments in defining the function is necessary to have been authenticated at the time of defining the function. However, it is possible to use the variables and functions used as arguments used inside without any condition only by performing security authentication of the defined function at the time of using the function after defining the function. With such a configuration, it is not necessary to prepare all authentication keys and perform authentication every time, and therefore, it is possible to facilitate the operation of the application.

A program written in a script language is easily rewritten after the program was downloaded. However, this feature causes a concern of falsification in an open platform. With the configuration of the information processing apparatus 100 according to an embodiment of the present disclosure, it is possible to prevent a program from being falsified.

Although the detailed description was given of preferred embodiments of the present disclosure with reference to the accompanying drawings, the present disclosure is not limited to such examples. It is obvious for those skilled in the art that various modifications and corrections can be made within the scope of the technique idea described in the appended claims, and it should be understood that all of the modifications and corrections belong to the technical scope of the present disclosure.

What is claimed is:

1. An information processing apparatus comprising:
a hardware processor which interprets and executes codes of a computer program created in a procedural language in an environment with a tamper resistant performance,
wherein a security attribute and an authentication key are provided in units of functions and variables in the computer program executed by the processor, and
wherein the processor executes authentication processing with the authentication key for executing the function, which makes it possible to execute the function based on the security attribute, wherein when security attribute has been added to a symbol that defines the function by the computer program, the processor can execute and change definition of the function without individually authenticating each of other functions and variables used inside the function, the other functions and variables being defined independent of the function, based on corresponding security attribute setting for the other functions and variables every time the other functions and variables are executed by performing authentication with an authentication key designated for the function.

2. The information processing apparatus according to claim 1,
wherein the processor executes authentication processing with the authentication key for referring to the variable and executing the function, which makes it possible to refer to the variable and execute the function based on the security attribute.

3. The information processing apparatus according to claim 1,
wherein an access attribute to the symbol, an authentication key version, and a pointer to an authentication key table are set in the security attribute, and
wherein the information processing apparatus is capable of changing definitions of the functions and the variables defined by the computer program executed by the processor by performing authentication with a system key.

4. The information processing apparatus according to claim 2,
wherein the information processing apparatus is capable of changing definitions of the functions and the variables defined by the computer program executed by the processor by performing authentication with a system key.

5. The information processing apparatus according to claim 2,
wherein when a function formula defining the function is specified as the symbol, authentication with all authentication keys for functions and variables used in the symbol and the function is necessary.

6. The information processing apparatus according to claim 2, wherein the processor encodes binary data delivered from an external apparatus in a predetermined format.

7. The information processing apparatus according to claim 6,
wherein the processor adds a sign, which is not used in the predetermined format, to a head of data obtained after converting the binary data delivered for the authentication processing.

8. The information processing apparatus according to claim 2, further comprising:
a storage device with a non-volatile feature, which stores variable definition and function definition used in the program executed by the processor.

9. The information processing apparatus according to claim 2,
wherein the computer program executed by the processor can set a security attribute and an authentication key in units of variables and functions at arbitrary timing.

10. The information processing apparatus according to claim 9,
wherein the security attribute is set with a symbol definition specific command in response to a command which defines a variable or a function.

11. The information processing apparatus according to claim 9,
wherein the security attribute is set with a symbol definition specific command after defining a variable or a function with a command which defines a variable or a function.

12. The information processing apparatus according to claim 2,
wherein setting of the security attribute further restricts reading and changing of information which defines a function.

13. The information processing apparatus according to claim 2,
wherein at least the processor includes a tamper resistant performance.

14. The information processing apparatus according to claim 2,
wherein the information processing apparatus is an IC card with an IC chip incorporated therein.

15. A program executing method comprising:
interpreting and executing, by a hardware processor, codes of a computer program created in a procedural language in an environment with a tamper resistant performance,
wherein a security attribute and an authentication key are provided in units of functions and variables in the computer program executed in interpreting and executing codes, and
wherein authentication processing with the authentication key is executed in interpreting and executing codes for executing the function, which makes it possible to execute the function based on the security attribute,
wherein when security attribute has been added to a symbol that defines the function by the computer program, the processor can execute and change definition of the function without individually authenticating each of other functions and variables used inside the function, the other functions and variables being defined independent of the function, based on corresponding security attribute setting for the other functions and variables every time the other functions and variables are executed by performing authentication with an authentication key designated for the function.

16. The program executing method according to claim 15,
wherein authentication processing with the authentication key is executed in interpreting and executing codes for referring to the variable and executing the function, which makes it possible to refer to the variable and execute the function based on the security attribute.

17. A non-transitory recording medium recorded with a computer program, the computer program comprising:
causing a computer to interpret and execute codes of the computer program created in a procedural language in an environment with a tamper resistant performance,
wherein a security attribute and an authentication key are provided in units of functions in the computer program executed in causing a computer to interpret and execute codes, and
wherein authentication processing with the authentication key is executed in causing a computer to interpret and execute codes for executing the function, which makes it possible to execute the function based on the security attribute,
wherein when security attribute has been added to a symbol that defines the function by the computer program, the processor can execute and change definition of the function without individually authenticating each of other functions and variables used inside the function, the other functions and variables being defined independent of the function, based on corresponding security attribute setting for the other functions and variables every time the other functions and variables are executed by performing authentication with an authentication key designated for the function.

18. The non-transitory recording medium according to claim 17,
wherein authentication processing with the authentication key is executed in causing a computer to interpret and execute codes for referring to the variable and executing the function, which makes it possible to refer to the variable and execute the function based on the security attribute.

* * * * *